US007565421B2

(12) United States Patent
Naruse

(10) Patent No.: US 7,565,421 B2
(45) Date of Patent: Jul. 21, 2009

(54) COMMUNICATION TERMINAL APPARATUS AND TRANSMISSION HISTORY CONTROL METHOD

(75) Inventor: Taketomo Naruse, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 10/866,792

(22) Filed: Jun. 15, 2004

(65) Prior Publication Data
US 2005/0005032 A1 Jan. 6, 2005

(30) Foreign Application Priority Data
Jun. 18, 2003 (JP) ............... 2003-173455

(51) Int. Cl.
G06F 15/16 (2006.01)
(52) U.S. Cl. .............. 709/223; 709/203; 709/219; 455/412.1; 455/556.2; 455/567
(58) Field of Classification Search ........... 709/223, 709/224, 203, 217, 219; 455/412.1, 415, 455/556.2, 564, 566, 567, 569, 412
See application file for complete search history.

(56) References Cited

U.S. PATENT DOCUMENTS

| 5,719,924 | A  | * | 2/1998  | Haneda et al. ...... 379/100.03 |
| 6,556,846 | B1 | * | 4/2003  | Kimura ................. 455/563  |
| 6,965,766 | B1 | * | 11/2005 | Saigo ................... 455/412.1 |
| 7,006,839 | B2 | * | 2/2006  | Okano .................. 455/466  |
| 7,143,110 | B2 | * | 11/2006 | Tomari et al. ......... 707/104.1 |
| 7,272,384 | B2 | * | 9/2007  | Tsukamoto ........... 455/412.1 |
| 7,283,813 | B2 | * | 10/2007 | Hamanaga et al. .... 455/415  |
| 2001/0042103 | A1 | * | 11/2001 | Tomari et al. ....... 709/206  |
| 2002/0065108 | A1 | * | 5/2002  | Tsukamoto ........... 455/564  |
| 2005/0170817 | A1 | * | 8/2005  | Matsutaka ........... 455/415  |
| 2006/0234770 | A1 | * | 10/2006 | Tsukamoto ........... 455/556.2 |
| 2008/0030308 | A1 | * | 2/2008  | Johnson ............... 340/286.02 |

FOREIGN PATENT DOCUMENTS

| EP | 0946030 A2 | * | 9/1999 |
| JP | 2001243146 A | * | 9/2001 |
| JP | 2004259194 | * | 9/2004 |

* cited by examiner

Primary Examiner—Lashonda T Jacobs
(74) Attorney, Agent, or Firm—Fitzpatrick, Cella, Harper & Scinto

(57) ABSTRACT

In a communication terminal apparatus having a telephone function, an information communication mode function and a transmission history display function, when transmission based on a telephone number described in an electronic information content such as an electronic mail, a website or the like is performed, the electronic information content is stored in a memory. Then, when a transmission history is displayed, the electronic information content is displayed in addition to transmission information by user handling. Thus, even if the transmission is performed while the electronic information content is being browsed, a user can know how situation the displayed transmission history is transmitted from.

14 Claims, 8 Drawing Sheets

COMMUNICATION TERMINAL APPARATUS AND TRANSMISSION HISTORY CONTROL METHOD

BACKGROUND OF THE INVENTION

1. Field of the Invention

The present invention relates to display of a transmission history in case of directly transmitting connection information described in an electronic information content from a screen being browsed (or accessed), in a communication terminal apparatus having an information communication mode function. Here, it should be noted that the information communication mode is an operation mode in an on-line data service, such as an Internet connection service, a message service and the like. However, the present invention is not limited only to these services.

2. Related Background Art

In a conventional communication terminal apparatus, when a history of transmission in a case where connection information is input by using a numeric keypad and an electronic telephone directory (hereinafter called transmission by a first transmission method) is displayed as a transmission history, transmission information (i.e., the connection information, a transmission time, and a name of party if it can be specified) is displayed on a display unit. Meanwhile, in a communication terminal apparatus having an information communication function, when a history in case of direct transmission by using an input means for selecting connection information while an electronic information content (e.g., an electronic mail, a website or the like) in which the connection information is described is being browsed (hereinafter called transmission by a second transmission method) is displayed as a transmission history, only transmission information (i.e., the connection information, a transmission time, and a name of party if it can be specified) is displayed as well as the transmission by the first transmission method. However, in these cases, when the transmission history is afterward displayed, a user cannot confirm or know how situation the displayed transmission history on the display unit is transmitted from. Therefore, when the user afterward accesses or browses the transmission history for the purpose of retransmission to the connection information included in the electronic information content, the user cannot have the conviction whether the displayed connection information is truly desired connected information. For this reason, the user worries about whether the retransmission has been surely connected to the target party.

SUMMARY OF THE INVENTION

The present invention has been made in order to solve such conventional problems as above, and an object thereof is to enable, in a case where a user tries to perform retransmission to a party, which is the same as that to which the user performed transmission at one time by the second transmission method, by using a transmission history in such past transmission, the user to easily find the transmission history in question by means of the structure for displaying, on a display screen which was used when the transmission history in question was displayed, an electronic information content is displayed in addition to transmission information (i.e., connection information, and a transmission time, and a name of party if it can be specified).

A communication terminal apparatus according to the present invention is characterized by comprising: a communication means for connecting to a communication line; an input means for inputting connection information for performing communication with a connection destination through the communication means; an obtaining means for obtaining transmission information in case of performing the communication with the connection destination through the communication means; a memory means for storing the transmission information; a display means for displaying the transmission information; a judgment means for judging whether or not predetermined information for the transmission information exists, when the transmission information stored in the memory means is input as the connection information by the input means; and a control means for performing control, when displaying a transmission history, so as to cause the display means to display the transmission information and the predetermined information when it is judged by the judgment means that the predetermined information exists, and so as to cause the display means to display only the transmission information when it is judged by the judgment means that the predetermined information does not exist. According to this structure, in a case where the user tries to perform retransmission to a telephone number, which has been described in the electronic information content and to which the user performed transmission at one time directly from the screen being browsed, by using the transmission history in such past transmission, the user can easily find the transmission history in question.

Moreover, the communication terminal apparatus according to the present invention is characterized in that, in the case where the transmission history is being displayed by the display means under the control of the control unit, the retransmission can be performed by predetermined user handling to the connection information stored in the transmission information held in the transmission history. According to this structure, the user can perform the retransmission as confirming the connection information, whereby it is possible to connect a target party more certainly.

Furthermore, the communication terminal apparatus according to the present invention is characterized in that the control means controls to be able to set the arbitrary number of transmission histories from one to the number storable by a memory area and controls the same transmission history so as not to duplicate. According to this structure, it is possible to hold the transmission history more effectively.

Furthermore, the communication terminal apparatus according to the present invention is characterized in that, in case of storing the transmission history, the memory unit stores a new transmission history by deleting an old transmission history when the number of the stored transmission histories has reached the upper limit. According to this structure, the new transmission history can be effectively stored, whereby it is possible to easily confirm the transmission history and thus perform retransmission based on the stored transmission history.

Furthermore, the communication terminal apparatus according to the present invention is characterized in that, in a case where an electronic mail is used for the predetermined information, a return mail to the displayed electronic mail can be transmitted by user handling when the transmission history is being displayed. According to this structure, it is possible for the user to easily transmit the electronic mail to the party to which the transmission was performed.

Furthermore, the communication terminal apparatus according to the present invention is characterized in that, in a case where a website is used for the predetermined information, it is possible to reconnect to an URL of the displayed website by user handling when the transmission history is being displayed. According to this structure, it is possible for the user to easily confirm the website of the party to which the transmission was performed.

DETAILED DESCRIPTION OF THE PREFERRED EMBODIMENT

Hereinafter, the preferred embodiment of the present invention will be explained in detail with reference to the accompanying drawings. Here, it should be noted that the present invention is not limited to the relative arrangements of the structured components, the display screens and the like which are disclosed in the embodiment.

Figure 1:
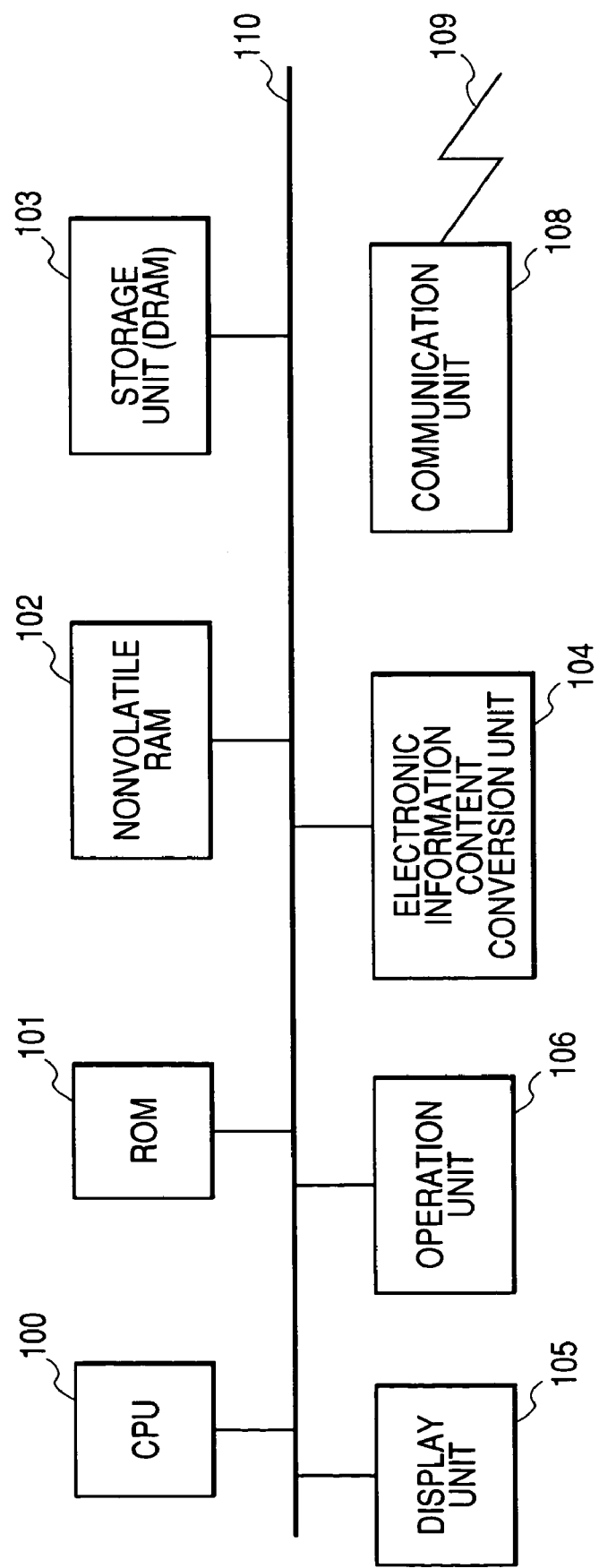
FIG. 1 is a block diagram showing the structure of a communication terminal apparatus according to the embodiment of the present invention.

A telephone apparatus, which has a function of holding transmission histories, as an embodiment of the present invention will be explained below. FIG. 1 is a structural view showing a structural example of the telephone apparatus, which has the function of holding the transmission histories, according to the present embodiment.

In FIG. 1, a reference numeral 100 denotes a central processing unit (CPU) for controlling an entire part of the telephone apparatus, a reference numeral 101 denotes a ROM for storing programs and data, a reference numeral 102 denotes a nonvolatile RAM for storing data for the backup such as personal data, a telephone directory and the like, a reference numeral 103 denotes a storage unit (DRAM) for storing CPU work data, transmission history data, display data, recording data, electronic information content obtained through a communication line, and the like. A reference numeral 104 denotes an electronic information content conversion unit for converting the stored electronic information content into the display data. A reference numeral 105 denotes a display unit for color displaying the electronic information content data which was converted into the display data through the electronic information content conversion unit 104 or status of the telephone apparatus, a reference numeral 106 denotes an operation unit structured by ten keys and the like, and a reference numeral 108 denotes a communication unit structured by a MODEM or the like for communicating with an external device by connecting with a communication line 109. Each of processing units is connected through a system bus 110.

Figure 2:
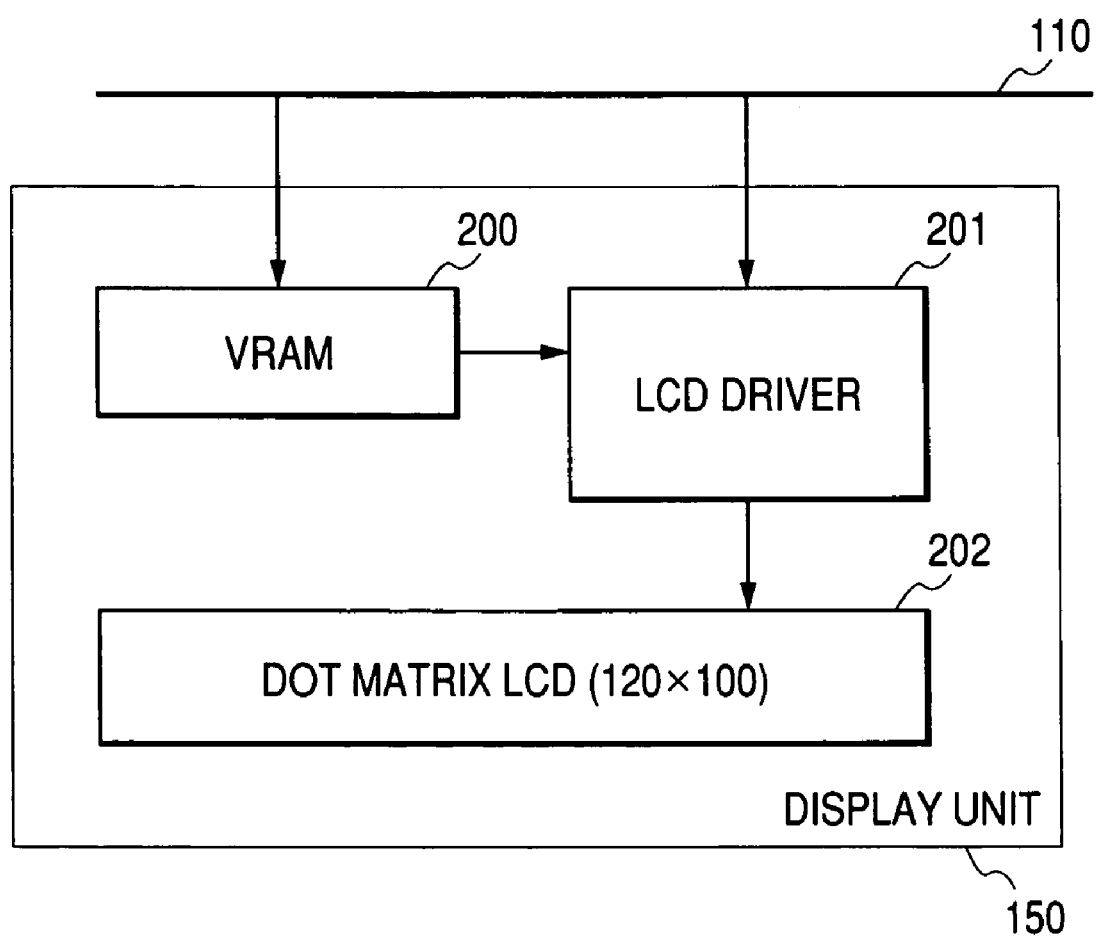
FIG. 2 is a block diagram showing the structure of a display unit of the communication terminal apparatus according to the embodiment of the present invention.

FIG. 2 is a structural view of the display unit 105. The display unit 105 includes a VRAM 200 for storing the display data and an LCD driver 201 for outputting the content in the VRAM 200 on a dot matrix LCD 202.

Figure 3:
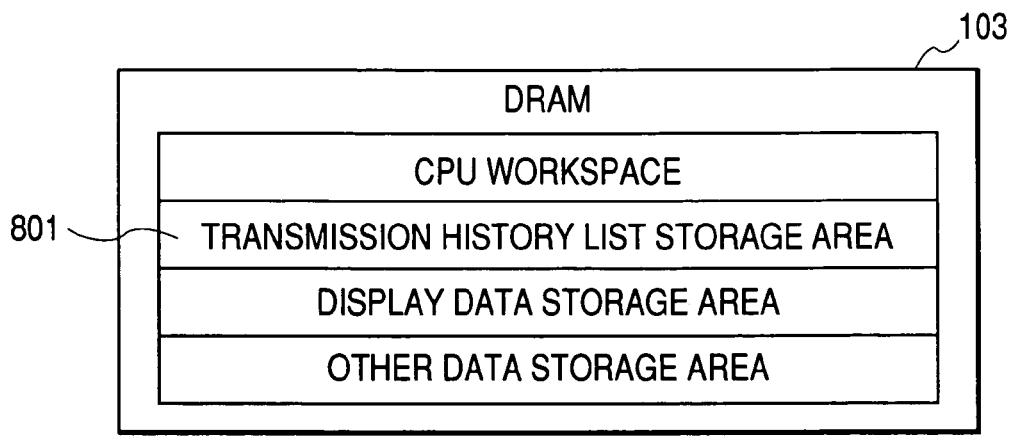
FIG. 3 is a block diagram showing the structure of a storage unit of the communication terminal apparatus according to the embodiment of the present invention.
Figure 3:
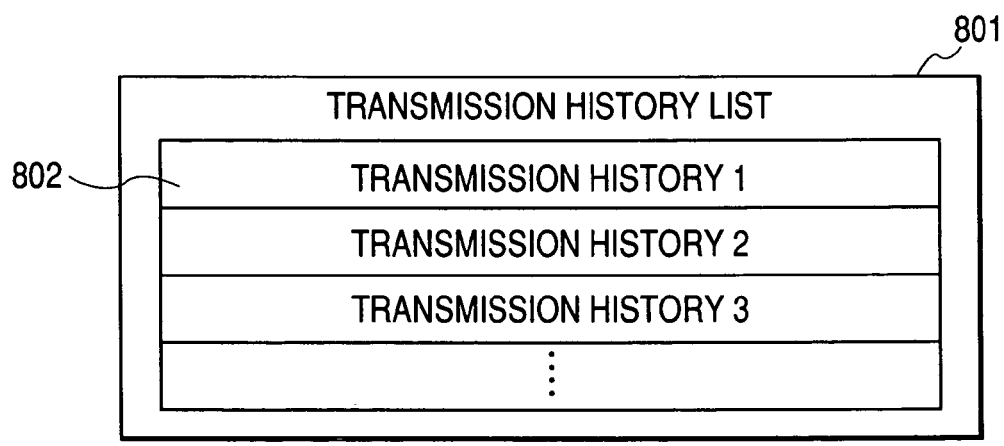
Figure 3:
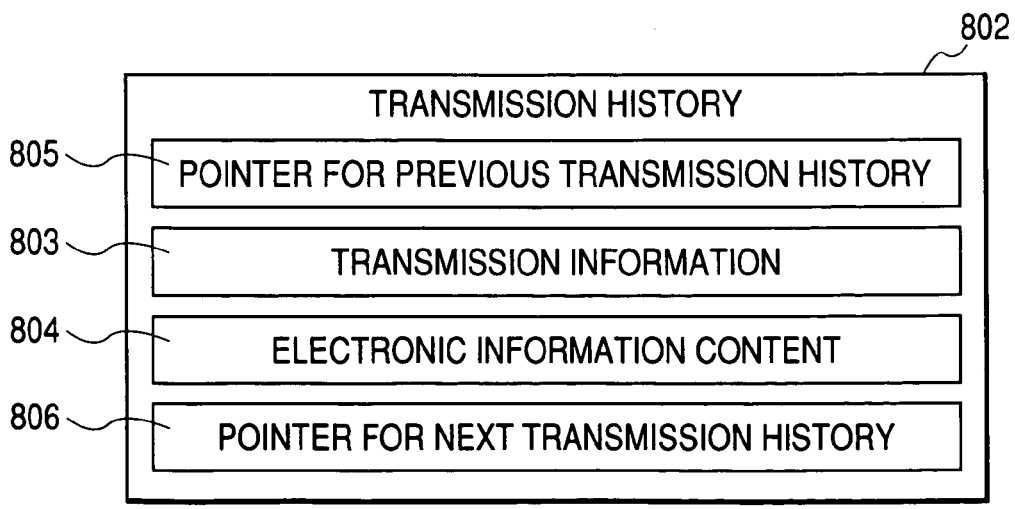

FIG. 3 is a memory map showing the internal structure of the DRAM 103. The DRAM 103 is structured by a CPU work area used as a work area of the CPU 100, a transmission history list storage area (transmission history list) 801, a display data storage area for storing the display data and other data storage area for storing other data. In the transmission history list storage area 801, the transmission histories are stored with a state of a list such as a transmission history 1, a transmission history 2 and the like. This list can have the arbitrary length of data as long as a memory area permits to memorize data. It should be noted that the transmission history list storage area 801 maintains a status of sorting the histories in order of the time. In a transmission history 802, transmission information (a transmission information storage area) 803, electronic information content (an electronic information content storage area) 804, a pointer 805 for the previous transmission history and a pointer 806 for the next transmission history are stored. In the transmission information 803, a telephone number being connecting information, a transmission date, information of the electronic information content such as a URL of a website, an address to an E-mail storage area, and the like are stored. In the electronic information content 804, the content of websites and E-mails are stored. If it is checked whether or not the electronic information content is stored in the electronic information content 804, it can be judged that which of a first transmission method (to be described later) or a second transmission method (to be described later) is used for the transmission. In the pointer 805 for the previous transmission history, a pointer for the oldest transmission history is stored among a set of the transmission histories more recent than the transmission history 802 for holding the pointer 805 for the previous transmission history. In the pointer 806 for the next transmission history, a pointer for the latest transmission history is stored among a set of the transmission histories older than the transmission history for holding the pointer 806 for the next transmission history. In the pointer 805 for the previous transmission history held by the latest transmission history 802 in the transmission history list 801, any data is not stored. That is, a head element in the transmission history list can be discriminated by searching the transmission history 802 holding the pointer 805 for the previous transmission history which does not store any data. In the pointer 806 for the next transmission history held by the oldest transmission history 802 in the transmission history list 801, any data is not stored. That is, a last element in the transmission history list can be discriminated by searching the transmission history 802 holding the pointer 806 for the next transmission history which does not store any data.

Figure 4:
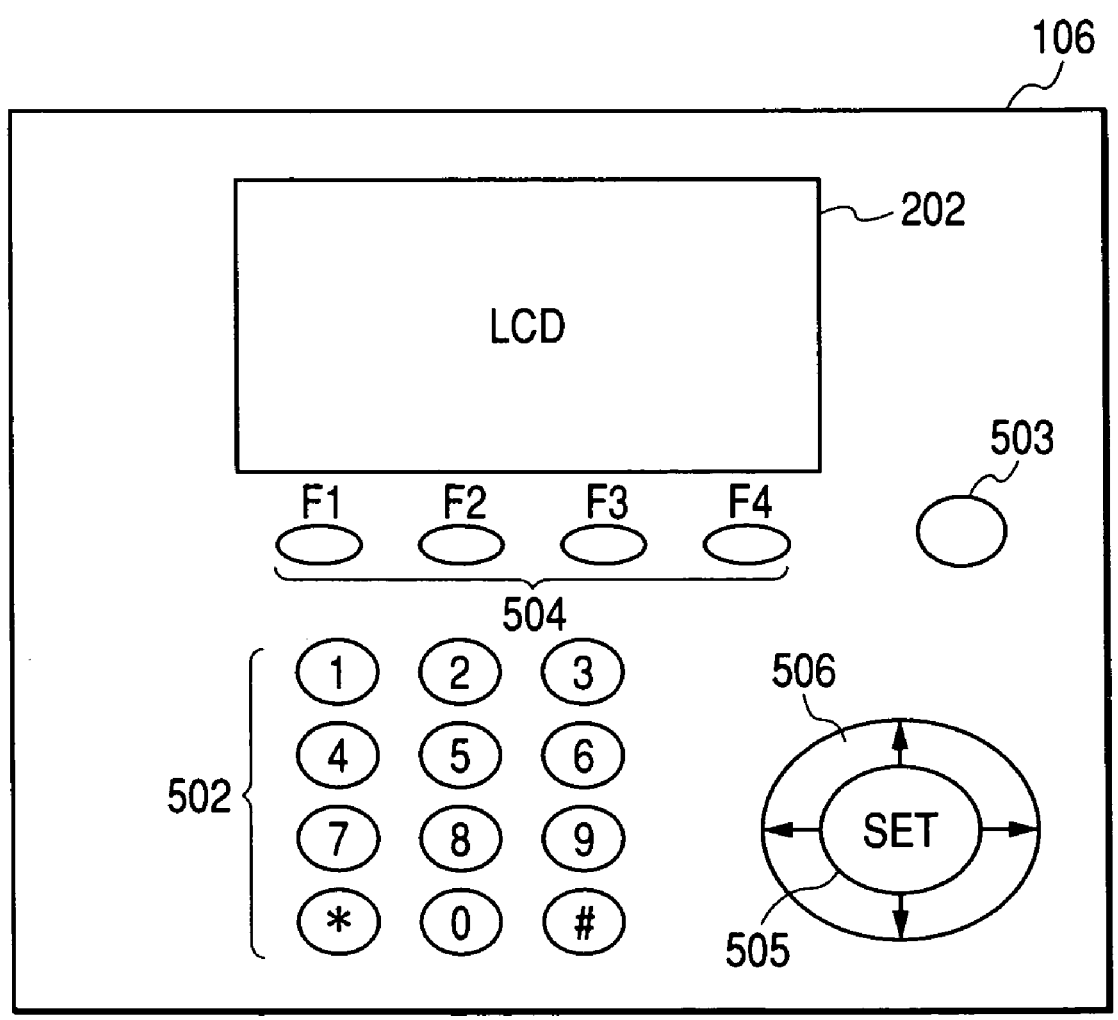
FIG. 4 is a block diagram showing the structure of an operation unit of the communication terminal apparatus according to the embodiment of the present invention.

FIG. 4 is an external structure view of the operation unit 106 of the telephone apparatus. The operation unit 106 includes an LCD 202, ten keys 502 used for inputting the telephone number or the like, a register key 503 used for setting functions, four function keys used for a multi-functional input, a set key 505 being a setting input key and a right/left and upper/lower directions key 506 used for moving a cursor on a display unit.

Hereinafter, the details of the first transmission method will be explained. The first transmission method corresponds to a method of performing transmission by inputting a telephone number by use of the ten keys 502, a method of performing the transmission by inputting the telephone number utilizing the personal data stored in the nonvolatile RAM 102 or telephone number information included in an electronic telephone directory or a method of performing the transmission by inputting the telephone number utilizing a transmission history of the transmission performed by use of the first transmission method. Transmission information transmitted in this condition is stored in the transmission information storage area 803.

Next, the details of the second transmission method will be explained. First, the electronic information content is obtained by utilizing an electronic information mode through the communication line 109 and the communication unit 108 and then the obtained data is transferred to the electronic information content conversion unit 104 to convert that data into the display data, and the converted data is stored in a display data area of the storage unit 103 as display bit map data. Further, among the data stored in the display data area, the data required to be displayed is sent to the VRAM 200 of the display unit 105 and is driven by the LCD driver 201 to be displayed on the dot matrix LCD 202. When the telephone number is described within the displayed electronic information content, a transmission method of performing a telephone transmission by selecting that telephone number by a user using the operation unit 106 corresponds to the second transmission method. A transmission method of performing transmission by inputting the telephone number utilizing a transmission history of the transmission performed by use of the second transmission method also corresponds to the second transmission method. Transmission information in case of performing the transmission by the second transmission method is stored in the transmission information storage area 803, and the electronic information content is stored in the electronic information content storage area 804.

In case of referring to the transmission history 802, it can be judged that the transmission history 802 is obtained by use of the first transmission method or the second transmission method by confirming whether or not the electronic information content is stored in the electronic information content storage area 804.

Figure 5:
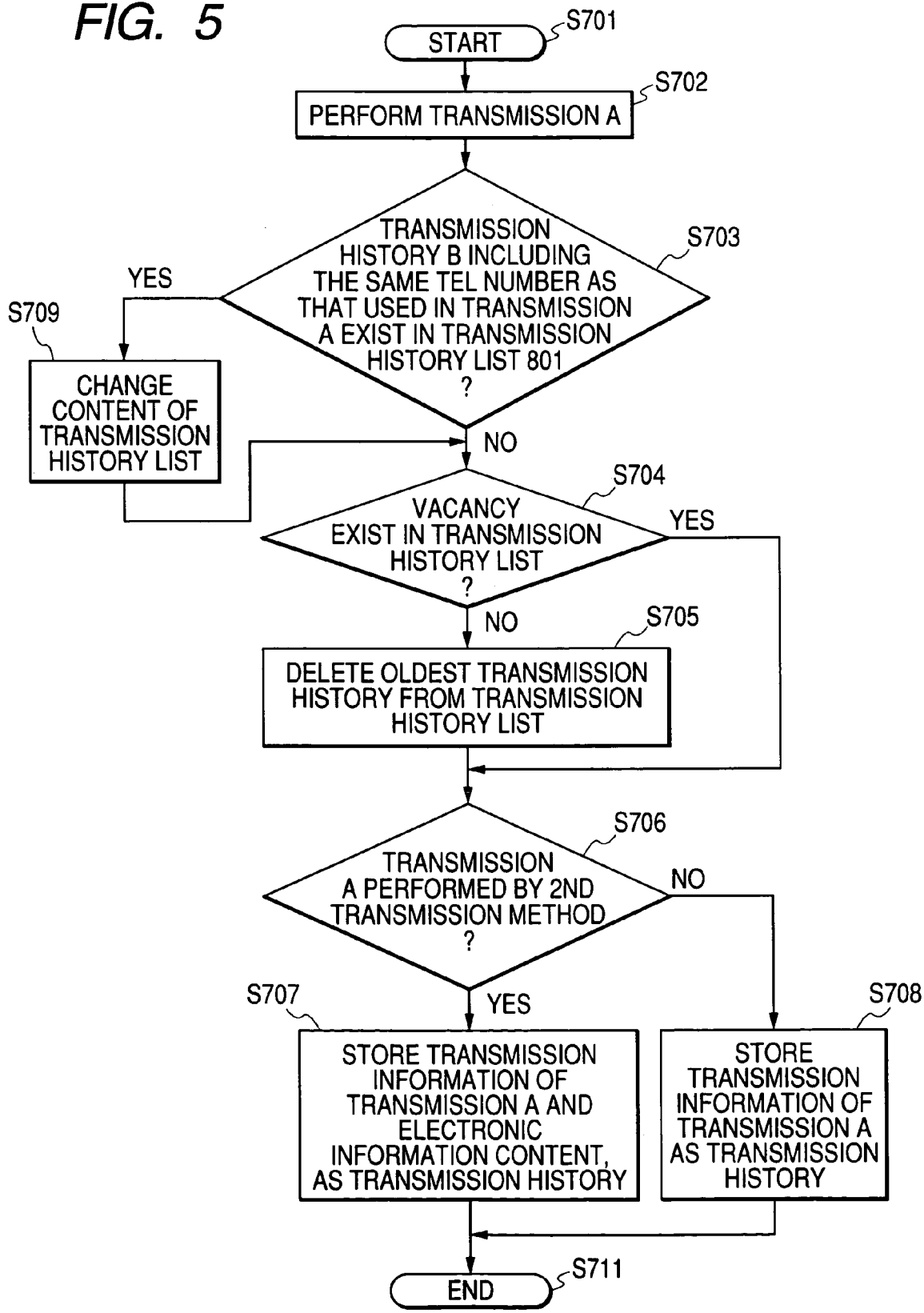
FIG. 5 is a flow chart showing an operation after calling a telephone of the communication terminal apparatus until storing a transmission history according to the embodiment of the present invention.

Next, a flow after performing the transmission until storing the transmission history will be explained with reference to FIG. 5.

First, a transmission is performed by use of the first transmission method or the second transmission method (S701 and S702). The transmission performed in this time is defined as a transmission A.

It is checked whether or not a transmission history having the same telephone number as that used in the transmission A exists within the transmission history list 801 (S703). Telephone connecting numbers held within the transmission information of the transmission history in the transmission history list 801 are compared with the telephone number in the transmission A from the head element to the last element in the list. If the same number is found, the transmission history thereof is defined as a transmission history B.

If two or more numbers are found, plural transmission histories B surely exist. Then, a flow advances to a step S709. If none of the transmission histories B is found, the flow advances to a step S704.

In the step S704, it is judged whether or not vacancy, where a new transmission history is written, exists in the transmission history list 801. If the vacancy does not exist, the flow advances to a step S705, and if the vacancy exists, the flow advances to a step S706. In the step S705, the new transmission history can be added to the transmission history list by deleting the oldest transmission history from the transmission histories stored in the transmission history list 801. The oldest transmission history can be extracted by searching the content in the transmission history list 801 from the head element to the last element and judging whether or not the pointer 806 for the next transmission history is stored in the list.

Next, it is judged whether or not the transmission A is performed by the second transmission method according to a fact whether or not the electronic information content is stored in the electronic information content storage area 804 (S706). When the transmission A is a telephone transmission performed by the first transmission method, transmission information of the transmission A is stored in the transmission information storage area 803 (S708). When the transmission A is performed by the second transmission method, the transmission information of the transmission A is stored in the transmission information storage area 803 and the electronic information content used in the transmission A is stored in the electronic information content storage area 804 (S707).

Figure 6:
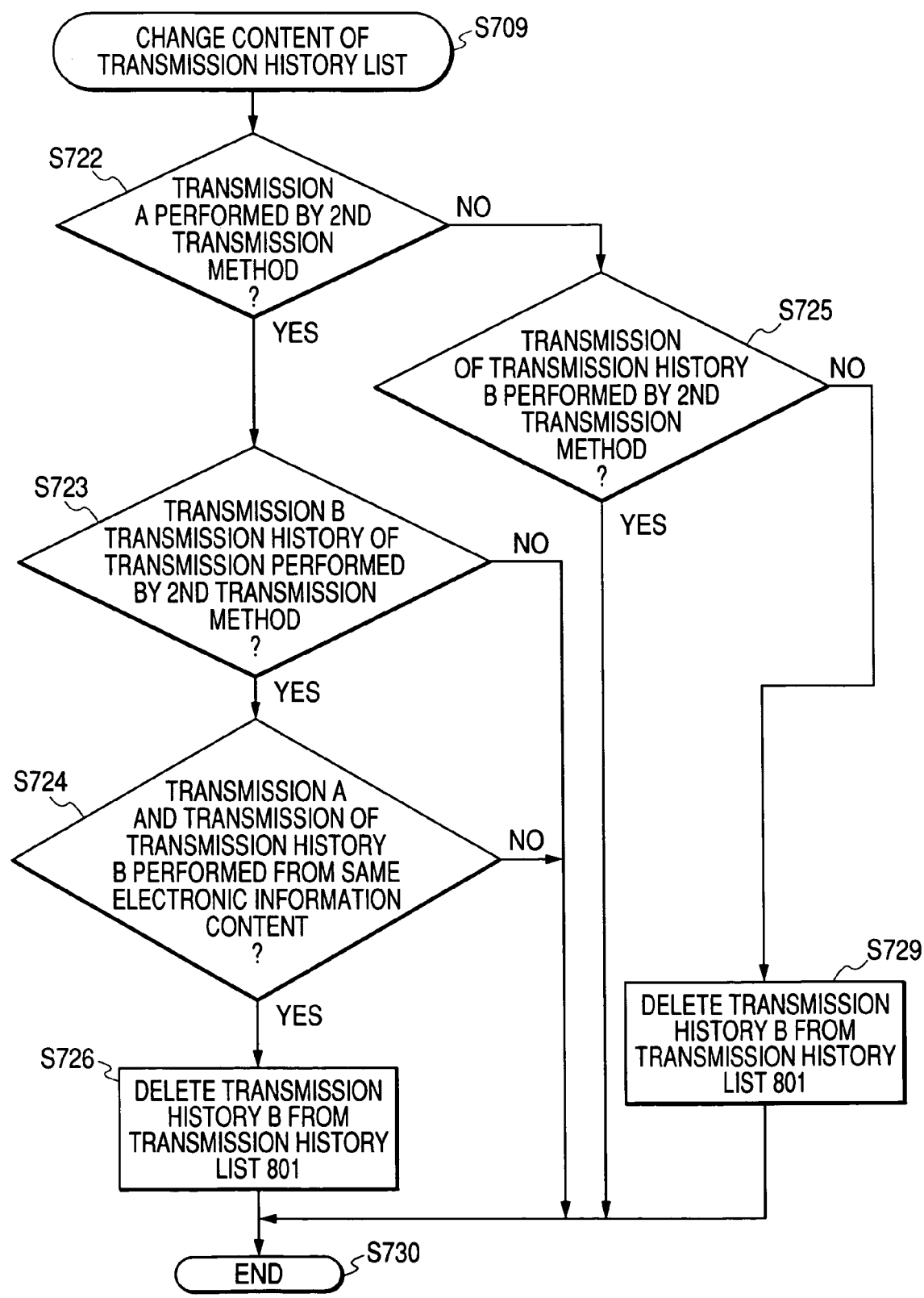
FIG. 6 is a flow chart showing an operation of changing the content of a transmission history list held in the communication terminal apparatus according to the embodiment of the present invention.

In the step S709, the content of the transmission history list is changed. A detailed flow in the step S709 is shown in FIG. 6. In this flow, it is aimed to eliminate the duplicated old transmission history in a case that the same transmission history existed in the past, when a transmission history is newly stored. First, it is judged whether or not the transmission A is performed by the second transmission method (S722). As a judgment result, if YES, the flow advances to a step S723, and if NO, the flow advances to a step S725.

In the step S723, it is judged whether or not the transmission history B is a history of a telephone transmission performed by the second transmission method. As a judgment result, if YES, the flow advances to a step S724. If NO, it is discriminated that the transmission A was performed by the second transmission method and the transmission history B is a transmission history of the transmission which was performed by the first transmission method, and even if the transmission history of the transmission A is stored, since that history is not a duplicate of the transmission history B, the flow ends (S730).

In the step S724, it is judged whether or not the electronic information content 804 corresponding to the transmission A is same as the electronic information content 804 corresponding to the transmission history B by comparing the contents of the two electronic information contents. As a compared result, if it is judged that they are not the same contents, even if the transmission history of the transmission A is stored, since that history is not the duplicate of the transmission history B, the flow ends (S730). If it is judged that they are the same contents, since the transmission history of the transmission A is same as the transmission history B, the older transmission history B is deleted from the transmission history list 801 (S726) in order to prevent to remain the duplicated transmission histories. Then, the flow ends (S730).

In the step S725, it is judged whether or not the transmission history B is a transmission history of the transmission performed by the second transmission method. As a judgment result, if YES, since the transmission A was performed by the first transmission method and the transmission history of the transmission A is not the duplicate of the transmission history B, the flow ends (S730). If NO, since both of the transmission A and the transmission of the transmission history B were performed by the first transmission method and the two transmission histories become the same history, the older transmission history B is deleted from the transmission history list 801 (S729) in order to prevent to remain the duplicated transmission histories. Then, the flow ends (S730).

The duplicated transmission histories can be eliminated from the transmission history list 801 by executing a process shown in FIG. 6, and a user can avoid from holding the same plural transmission histories. A condition of regarding the histories as the duplicated histories is that the transmissions of the two transmission histories were performed by the first transmission method and connecting information held in the transmission information 803 is in a coincident status, or the transmissions of the two transmission histories were performed by the second transmission method and the connecting information held in the transmission information 803 is in a coincident status and further the electronic information contents 804 is in a coincident status.

Next, a displaying method of the transmission history in the present telephone apparatus will be explained with reference to FIG. 7.

When the user performs an operation of displaying the transmission history by the operation unit 106 (S741), the latest transmission history C is obtained from the DRAM 103.

In a case that there is not any transmission history in the transmission history list 801, an operation of displaying the transmission history is ended (S742, S743, S744 and S752).

In case of obtaining the transmission history C, it is judged whether or not the transmission of the transmission history C is performed by the second transmission method according to a fact whether or not the electronic information content is stored in the electronic information content storage area 804 (S745).

When the electronic information content is stored, transmission information of the transmission history C and the electronic information content are obtained (S746).

When the electronic information content is not stored, only the transmission information of the transmission history C is obtained (S747). Then, the obtained transmission information or both of the transmission information and the electronic information content are displayed (S748).

Figure 8:
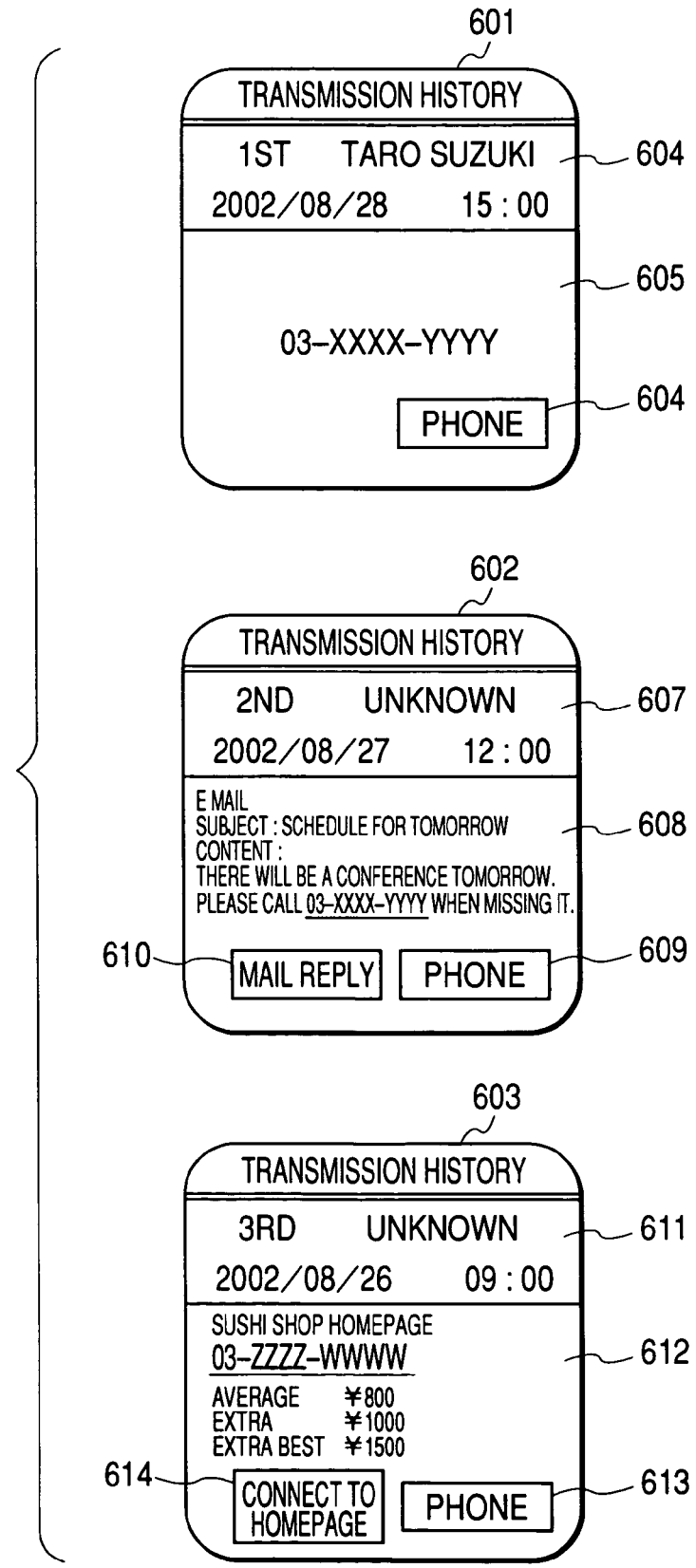
FIG. 8 is a view showing transmission history display examples in the communication terminal apparatus according to the embodiment of the present invention.

Examples of the displayed transmission histories are indicated by transmission history screens 601, 602 and 603 shown in FIG. 8.

The transmission history screen 601 is a display example of the transmission history in case that the transmission was performed by the first transmission method. A reference numeral 604 denotes transmission information stored in the transmission information 803. A reference numeral 605 denotes a telephone number of a calling party being connecting information among the transmission information stored in the transmission information 803. A reference numeral 606 denotes an electronic button portion used for recalling the telephone. The user can recall the telephone by selecting the electronic button portion 606 by use of the operation unit 106.

The transmission history screen 602 is a display example of the transmission history in case that the transmission was performed by the second transmission method and an E-mail was used as the electronic information content. A reference numeral 607 denotes transmission information stored in the transmission information 803. A reference numeral 608 denotes the E-mail stored in the electronic information content 804. A reference numeral 609 denotes an electronic button portion used for recalling the telephone. The user can recall the telephone by selecting the electronic button portion 609 by use of the operation unit 106. Similarly, a reference numeral 610 denotes an electronic button portion, which is used for sending a reply E-mail, by which the user can send the reply E-mail to a party who calls the telephone.

The transmission history screen 603 is a display example of the transmission history in case that the transmission was performed by the second transmission method and a website was used as the electronic information content. A reference numeral 611 denotes transmission information stored in the transmission information 803. A reference numeral 612 denotes a website stored in the electronic information content 804. A reference numeral 613 denotes an electronic button portion used for recalling the telephone. The user can recall the telephone by selecting the electronic button portion 613 by use of the operation unit 106. Similarly, a reference numeral 614 denotes an electronic button portion, which is used for connecting to the website, by which the user can connect to the website of a party who calls the telephone.]

Figure 7:
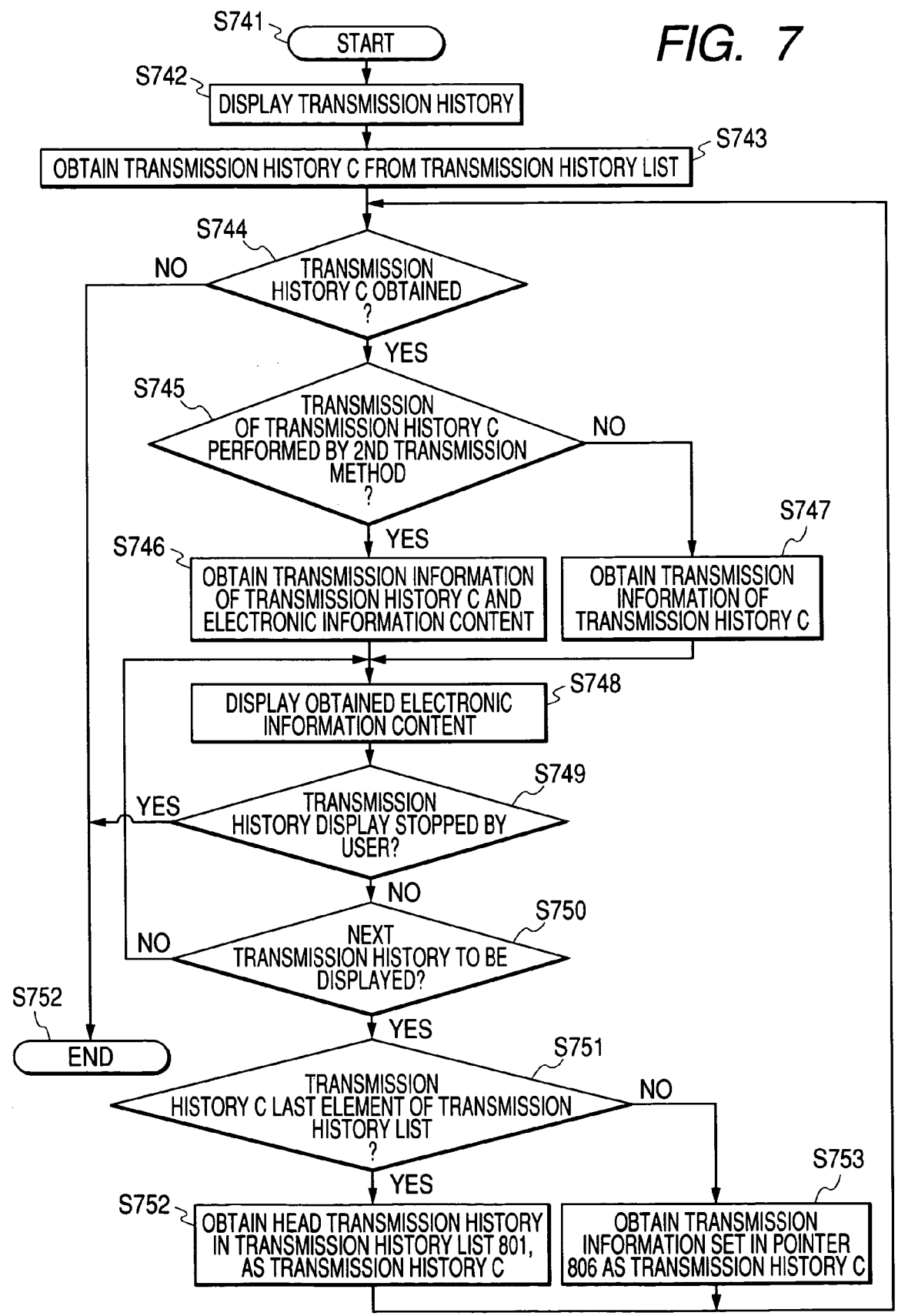
FIG. 7 is a flow chart showing an operation of displaying the transmission history held in the communication terminal apparatus according to the embodiment of the present invention.

Here, return to the explanation in FIG. 7. When a display of the transmission history is stopped, an operation of stopping the display is performed in the operation unit 106 (S749) to end the flow.

When the next new transmission history, which follows the transmission history presently displayed, is desired to display, an operation thereof is performed by use of the operation unit 106 (S750). At this time, it is judged whether or not the transmission history presently displayed is the oldest transmission history by checking an area for storing the pointer 806 for the next transmission history (S751).

If the pointer is stored, the next new transmission history is obtained (S753), and if the pointer is not stored, the latest transmission history is obtained (S752).

Then, the flow returns to a step S744, where it is judged whether or not the transmission of the obtained transmission information of the transmission history was performed by the second transmission method.

As explained above, according to the present invention, when the user refers to the transmission history intending to recall the telephone, since the electronic information content indicating the condition when the transmission was performed is displayed regarding the telephone number remained in the transmission history by using the electronic information content for the transmission history, a communication party can be easily specified, and it becomes possible to call the telephone without anxiety.

Further, in case of performing a transmission to a calling destination party not stored in an electronic telephone directory or the like, effectiveness can be exhibited.

What is claimed is:

1. A communication terminal apparatus having a telephone function, comprising:
   a communication unit constructed to connect to a communication line and to receive a content via the communication line;
   an input unit constructed to input connection information for performing communication with a connection destination through said communication unit;
   a display unit constructed to display the content received by said communication unit;
   a first memory unit constructed to store, as a connection history, a telephone number of a communication party to which a transmission is performed by the telephone function, and content corresponding to the telephone number of the communication party;
   an instruction unit constructed to instruct said display unit to display the connection history stored by said first memory unit;
   a judgment unit constructed to judge, when it is instructed by said instruction unit to display the connection history, whether or not the content corresponding to the telephone number as the connection history is stored; and a control unit constructed to perform control to store, when the transmission is performed from the telephone number included in the content displayed by the display unit, the telephone number together with the content as the connection history, wherein the control unit performs a display control based on a result of the judgment by the judgment unit when the telephone number of the connection history is displayed on the display unit, such that, when the content corresponding to the telephone number displayed is stored in the connection history, the content is displayed by the display unit together with the telephone number of the connection history, and, when the content corresponding to the telephone number displayed is not stored in the connection history unit, the telephone number of the connection history is displayed without the content by the display unit.

2. A communication terminal apparatus according to claim 1, wherein, when the connection history is being displayed by said display unit under the control of said control unit, retransmission can be performed by predetermined user handling to the connection history stored in said first memory unit.

3. A communication terminal apparatus according to claim 1, wherein said control unit controls to set an arbitrary number of connection histories from one to a number storable by the first memory unit and controls the same connection history so as not to duplicate.

4. A communication terminal apparatus according to claim 1, wherein, in case of storing the connection history, said first memory unit stores a new connection history by deleting an old connection history when the number of the stored connection histories has reached an upper limit.

5. A communication terminal apparatus according to claim 1, wherein, when the content represents an electronic mail, a return mail to the displayed electronic mail can be transmitted by user handling when the connection history is being displayed.

6. A communication terminal apparatus according to claim 1, wherein, when the content represents a website, reconnection to an URL of the displayed website can be performed by user handling when the connection history is being displayed.

7. A communication terminal apparatus according to claim 1, further comprising a selection unit constructed to select plural connection histories stored by said first memory unit so as to sequentially display them, wherein said judgement unit judges whether or not the content associated with the connection histories is stored, every time the connection histories are selected by said selection unit.

8. A connection history control method performed by a communication terminal apparatus having a telephone function, comprising:

a communication step of causing a communication unit to connect to a communication line and to receive a content via the communication line;

an input step of inputting connection information for performing communication with a connection destination through said communication unit;

a display step of displaying the content received by said communication step;

a storage step of causing a first memory unit to store, as a connection history, a telephone number of a communication party to which a transmission is performed by the telephone function, and received content corresponding to the telephone number of the communication party;

an instruction step of instructing to display the connection history stored by the first memory;

a judgment step of judging, when it is instructed by said instruction step to display the connection history, whether or not the content corresponding to the telephone number as the connection history is stored; and a control step of performing control to store, when the transmission is performed from the telephone number included in the content displayed by the display step, the telephone number together with the content as the connection history, wherein the control step performs a display control based on a result of the judgment by the judgment step when the telephone number of the connection history is displayed by the display step, such that, when the content corresponding to the telephone number displayed is stored in the connection history, the content is displayed by the display step together with the telephone number of the connection history, and, when the content corresponding to the telephone number displayed is not stored in the connection history, the telephone number of the connection history is displayed without the content by the display step.

9. A connection history control method according to claim 8, wherein, when the connection history is being displayed by the display unit in said control step, retransmission can be performed by predetermined user handling to the connection history stored in said first memory.

10. A connection history control method according to claim 8, wherein said control step controls to set an arbitrary number of connection histories from one to a number storable by the first memory and controls the same connection history so as not to duplicate.

11. A connection history control method according to claim 8, wherein, in case of storing the connection history, said storage step causes the first memory unit to store a new connection history by deleting an old connection history when the number of the stored connection histories has reached an upper limit.

12. A connection history control method according to claim 8, wherein, when the content represents an electronic mail, a return mail to the displayed electronic mail can be transmitted by user handling when the connection history is being displayed.

13. A connection history control method according to claim 8, wherein, when the content represents a website, reconnection to an URL of the displayed website can be performed by user handling when the connection history is being displayed.

14. A connection history control method according to claim 8, further comprising a selection step of selecting plural connection histories stored by said first memory unit so as to sequentially display them, wherein said judgement step judges whether or not the content associated with the connection histories is stored, every time the connection histories are selected by said selection step.

* * * * *